United States Patent [19]
Ford et al.

[11] 3,776,759
[45] Dec. 4, 1973

[54] PRODUCTION OF NUCLEAR FUEL PARTICLES COATED WITH SILICON CARBIDE

[75] Inventors: Lionel Houston Ford, St. Annes-on-sea, Lancashire; Roger William Davidge, Wantage, Berkshire, both of England; Anthony Glyn Evans, Santa Monica, Calif.

[73] Assignee: United Kingdom Atomic Energy Authority, London, England

[22] Filed: Dec. 22, 1971

[21] Appl. No.: 210,911

[30] Foreign Application Priority Data
Jan. 8, 1971   Great Britain ..................... 1,119/71

[52] U.S. Cl. .......... 117/69, 117/100 B, 117/106 C, 117/DIG. 6, 176/82, 176/91 SP, 264/0.5
[51] Int. Cl. .................................................. G21c 3/20
[58] Field of Search ............... 117/106 C, 107.2 R, 117/169 R, 69, 100 B, 100 M, 216; 176/82, 91 SP; 264/0.5

[56] References Cited
UNITED STATES PATENTS

| | | | |
|---|---|---|---|
| 3,284,549 | 11/1966 | Ford et al. .................... | 117/100 B X |
| 3,276,968 | 10/1966 | Ingleby ........................ | 117/100 B X |
| 3,382,113 | 5/1968 | Ebert et al. .................. | 117/106 C X |
| 3,166,614 | 1/1965 | Taylor ............................ | 176/91 SP |
| 3,121,047 | 2/1964 | Stoughton et al. ............. | 176/91 SP |
| 3,361,638 | 1/1968 | Bokros et al. .................. | 176/91 SP |

*Primary Examiner*—Ralph Husack
*Attorney*—Roberts B. Larson et al.

[57] ABSTRACT

In the production of nuclear fuel particles carbon-coated nuclear fuel kernels are coated with silicon carbide. Deposition of the silicon carbide at a low rate increases the strength of the silicon carbide coating. It is necessary only for the outer layers to be deposited at the low rate. The temperature of deposition, the nature of the substrate and the composition of fluidising gas may be relevant factors.

6 Claims, 2 Drawing Figures

PRODUCTION OF NUCLEAR FUEL PARTICLES COATED WITH SILICON CARBIDE

This invention relates to the production of articles coated with silicon carbide and in particular to the production of coated particle nuclear fuel.

BACKGROUND OF THE INVENTION

Coated particle nuclear fuel is designed so that the particles will retain both solid and gaseous fission products when it is irradiated to a set burn-up level. Typically a coated nuclear fuel particle comprises a spherical ceramic nuclear fuel kernel containing fissile and/or fertile elements such as uranium dioxide, uranium dicarbide, or a mixture of uranium and thorium dicarbides, surrounded by a porous carbon buffer coating. The carbon buffer coating is then followed by a coating sequence of high density isotropic pyrolytic carbon, dense silicon carbide and finally high density isotropic pyrolytic carbon. If the particle has a uranium dioxide fuel kernel and the inner high density isotropic pyrolytic carbon coating is deposited at a temperature in excess of 1,500° it is necessary to deposit a sealing coating of pyrolytic carbon on to the buffer coating to prevent reaction between it and the kernel. In the course of irradiation the porosity in the kernel and the buffer coating provides accommodation for the gaseous fission products produced and thus maintains the gaseous fission product pressure within the coated particle at an acceptable level. The inner high density isotropic pyrolytic carbon coating acts to retain gaseous fission products. The silicon carbide coating retains solid fission products passing through the inner high density isotropic pyrolytic carbon coating. Fission fragments which could damage the inner high density isotropic pyrolytic carbon coating are retained in the buffer coating.

SUMMARY OF THE INVENTION

Hitherto, with the above type of coated nuclear fuel particle is as been assumed that the silicon carbide coating will have a low resistance to tensile stress and this limits the predicted burn-up level that the particle can reach. It has now been discovered that a dense high strength silicon carbide coating for an article can be produced by the deposition of silicon carbide on to a substrate at a low rate of deposition. However, a disadvantage of silicon carbide coatings deposited at low deposition rates is that they extend the time taken to complete the coating cycle and will thus increase the overall cost of production of coated nuclear fuel particles. The present invention accordingly consists in one of its aspects in a coated nuclear fuel kernel having a silicon carbide coating with its outer layers deposited at a lower rate than inner layers and in another aspect in the improvement of depositing outer layers of a silicon carbide coating on a coated nuclear fuel kernel at a lower rate than inner layers.

DESCRIPTION OF THE PREFERRED EMBODIMENTS

Pyrolytic silicon carbide can be desposited from the vapour phase as a coherent coating using various combinations of silicon and carbon containing compounds. The reduction of methyltrichlorosilane in a fluidised bed has been found the most convenient process for deposition of such coatings on carbon coated nuclear fuel kernels. This process has been used by us. The coating unit comprised a graphite reaction tube which was held in a graphite resistance-heated furnace. The carbon-coated nuclear fuel kernels were held in central cone-based insert within the reaction tube with a gas inlet at the base of the cone. The fluidising/reactant gases were introduced to the base of the cone via a water-cooled inlet tube. In a typical example the deposition was initially carried out at a high rate of approximately 1.0 $\mu$m/minute for a coating of 50 $\mu$m and this was reduced to a rate of approximately 0.1 $\mu$m/minute whilst depositing the final 5 microns. Silicon carbide coatings produced in this way were obtained in much shorter time than coatings deposited entirely at the lower rate but the strengths were not significantly different.

Figure 1:
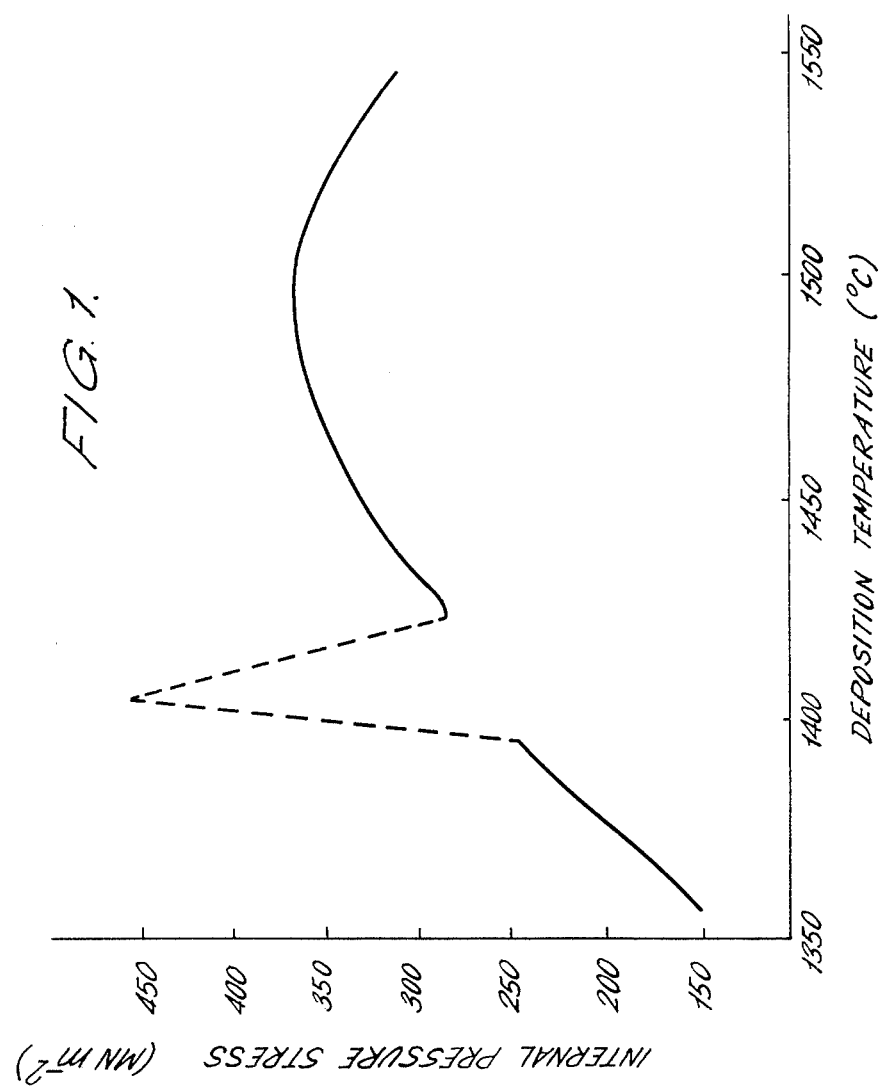

Surface refinement in accordance with the invention may be achieved in the temperature range 1,400° – 1,700° C. The effect of temperature is illustrated in the accompanying graph, FIG. 1, in which the strength of the outer surface of slicon carbide coatings deposited at 0.1 $\mu$m/minute is plotted against deposition temperature. It will be seen that a maximum strength is achieved in the range 1,400°—1,420° C. at temperatures below 1,400° C relatively low values are obtained and at temperatures above 1,420° C the strength rises to a broad maximum at 1,500° C. More consistently reproducible results are achieved at the higher temperatures than in the narrow range 1,400° – 1,420° C which is difficult to control. The following results have been obtained at 1,500° C.

| Deposition rate micron/min | Mean strength psi | MN/m² |
|---|---|---|
| 0.1 | 55×10³ | 370 |
| 0.4 | 34×10³ | 260 |
| 1.5 | 25×10³ | 175 |

At the inner surface all coatings had a strength in excess of 60 × 10³ psi.

Figure 2:
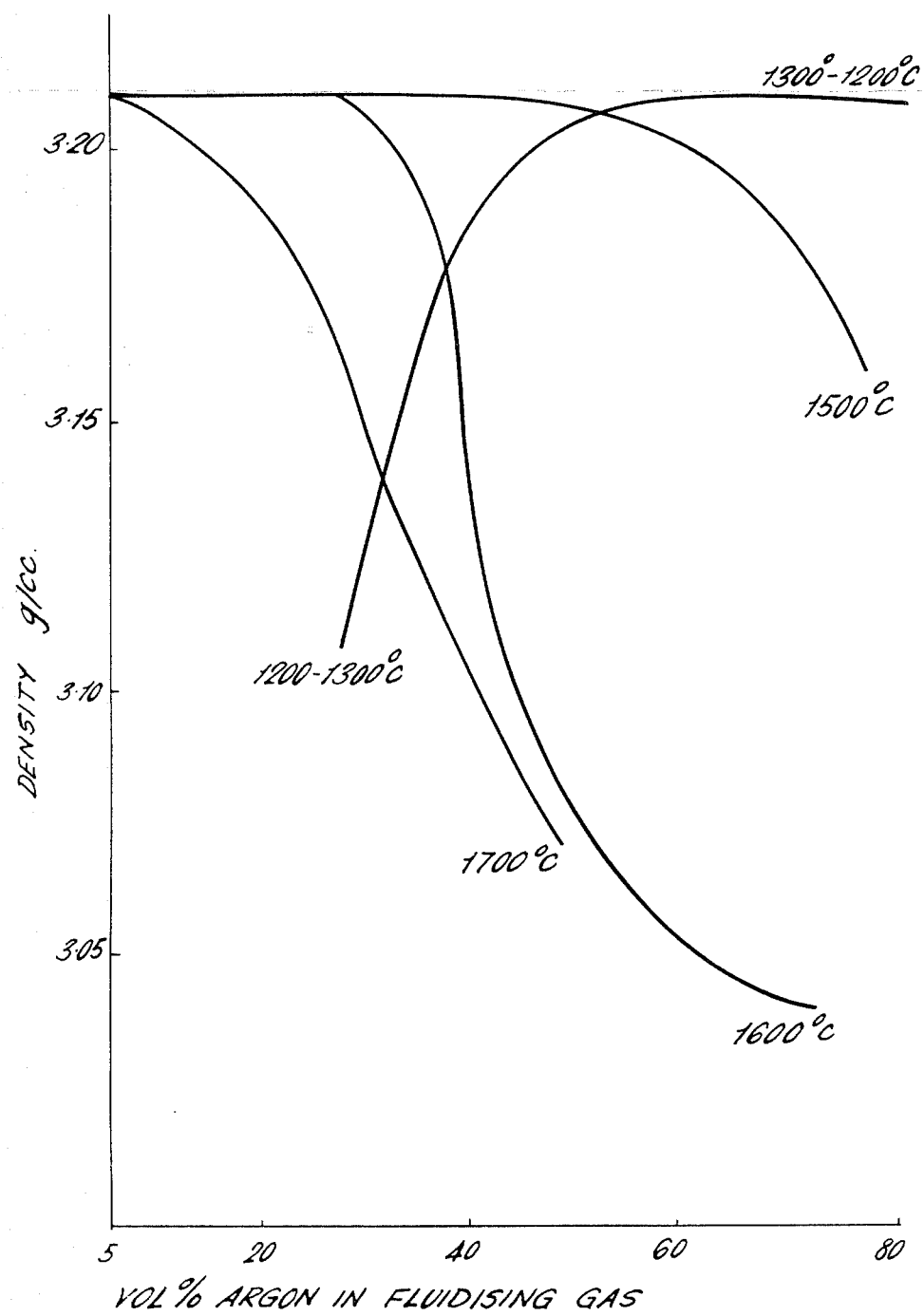

A relationship has been noted between surface morphology and strength and a smooth substrate with a substantially defect-free surface may be desirable before depositing a silicon carbide coating. To provide such a substrate a thin (10–5 $\mu$m) smooth pyrocarbon layer can be deposited on to an inner high density pyrolytic carbon coating on a nuclear fuel kernel. This layer can conveniently be deposited from methane at 1,300° C and a partial pressure of 200 mm of mercury and it may sometimes by preferable to carry out the primary silicon carbide deposition at that same temperature to avoid thermal stresses even though there is then some reduction in the strength of the silicon carbide coating compared with deposition at high temperatures. It is nevertheless considered important to maintain the high density of the inner layers of silicon carbide so that they effectively contain fission products and it has been found that by using various argon/hydrogen mixtures dependent on temperature it is possible to deposit the major part of the silicon carbide at or near its theoretical density in the temperature range 1,200°–1,700° C and at 1–2 microns/minute, then deposit a refined outer layer at less than 0.2 micron/minute at 1,500° C, for example. The influence of argon additions is indicated by the accompanying graph, FIG. 2. Thus it will be seen that at a deposition temperature of 1,500°C the density falls when more than 50–60 percent by volume of argon is added but at a given argon addition rate the density recovers if the deposition temperature is reduced towards 1,300° C.

By use of the invention the predicted burn-up at particle coating failure will be increased because of the increase in the tensile strength of the silicon carbide coating. Thus a burn-up of approximately 20 percent of the fissile material in the kernel at particle coating failure is predicted when a particle is provided with a silicon carbide coating capable of withstanding tensile stresses of $43.5 \times 10^3$ psi. It is therefore possible to prepare coated nuclear fuel particles each incorporating a high strength silicon carbide coating conforming to an existing coating thickness specification, but capable of withstanding much higher burn-ups before coating failure occurs than at present predicted. In addition by depositing thicker high strength silicon carbide coatings it is possible to reduce the thickness of the high density isotropic pyrolytic carbon coats. This will also allow high burn-ups than at present predicted. By depositing thinner silicon carbide coatings the particle will contain a higher concentration of fissile material and still accommodate present burn-up levels at coating failure.

An additional feature of silicon carbide coatings deposited at low deposition rates is that virtually no micro-porosity has been observed within them as opposed to the 1-2 micron diameter pores in nominally fully dense silicon carbide deposited at a rate of 1.5 $\mu$m/minute. Thus the high strength dense silicon carbide coating may act to reduce the rate of caesium diffusion. Further, where coated nuclear fuel particles having dense high strength silicon carbide coatings are incorporated into compacts, the high strength of the silicon carbide coatings increases the point loading the particles will stand and thus reduces the number of damaged particles arising during the compaction process.

We claim:

1. In the deposition of a silicon carbide coating on a coated nuclear fuel particle wherein the improvement comprises depositing inner layers of the silicon carbide coating at a higher rate than outer layers of the silicon carbide coating, the rate of deposition of the outer layers being less than 0.2 $\mu$m per minute.

2. The improvement of claim 1 wherein at least the outer layers of the silicon carbide coating are deposited at a temperature in the range 1,400° to 1,600° C.

3. The improvement of claim 1 wherein hydrogen with argon additions are used as the fluidizing gas.

4. The improvement of claim 3 wherein the inner layers of the silicon carbide coating are deposited in the temperature range 1,200°–1,700° C and the deposition of the silicon carbide coating is preceded by deposition of a carbon coating at the same temperature.

5. The improvement of claim 1 wherein the outer surface of the coated nuclear fuel particle is smooth and substantially defect-free.

6. The product produced by the process of claim 1.

* * * * *